United States Patent [19]

Ahearn

[11] Patent Number: 5,460,305

[45] Date of Patent: Oct. 24, 1995

[54] MAGNETICALLY MOUNTED TOOL POUCH

[76] Inventor: Michael J. Ahearn, 230 N. 5th Ave., Wasau, Wis. 54401

[21] Appl. No.: 232,711

[22] Filed: Apr. 25, 1994

[51] Int. Cl.$^6$ ............................... B60R 7/00; B60R 7/10; B60R 9/00; B60R 11/00
[52] U.S. Cl. ..................... 224/562; 224/42.31; 224/563; 248/206.5; 248/309.4; 211/DIG. 1; 280/770
[58] Field of Search ..................... 224/42.45 R, 42.46 R, 224/42.31, 907; 150/166, 168; 293/128, DIG. 6; 296/136, 37.1; 280/770; 248/206.5, 309.4; 211/DIG. 1

[56] References Cited

U.S. PATENT DOCUMENTS

| | | | |
|---|---|---|---|
| 3,298,712 | 12/1965 | Greenstadt | 150/166 |
| 4,047,773 | 9/1977 | Semany | 312/108 |
| 4,736,853 | 4/1988 | O'Mara | 248/206.5 |
| 4,826,059 | 5/1989 | Bosch et al. | 224/907 |
| 5,022,521 | 6/1991 | Kane | 206/818 |
| 5,195,778 | 3/1993 | Dismuke | 150/166 |

Primary Examiner—Henry J. Recla
Assistant Examiner—Timothy L. Maust

[57] ABSTRACT

A magnetically mounted tool pouch including a soft flexible fabriclike protective panel member having a plurality of magnets distributed therein for the purpose of holding the panel member to the side of an automobile and furthermore the panel member has a series of pouches affixed to an outer surface for the purpose of holding tools. The magnetically mounted tool pouch is generally used by personnel working beneath a vehicle on a movable platform commonly referred to as a creeper thereby protecting the automobile side panels from grease and damage from the hands of a mechanic moving to and from the vehicle underside. And the magnetically mounted tool pouch provides rapid tool access by holding tools frequently needed by the mechanic within easy reach.

1 Claim, 4 Drawing Sheets

MAGNETICALLY MOUNTED TOOL POUCH

BACKGROUND OF THE INVENTION

1. Field of the Invention

The present invention relates to tool holding pouches and more particularly pertains to a magnetically mounted tool pouch which may be employed to hold tools in orderly disposition upon a side of a vehicle and furthermore to provide a detachable protective covering of the vehicle side.

2. Description of the Prior Art

The use of tool pouches is known in the prior art. More specifically, tool pouches heretofore devised and utilized for holding tools are known to consist basically of familiar, expected and obvious structural configurations, notwithstanding the myriad of designs encompassed by the crowded prior art which have been developed for the fulfillment of countless objectives and requirements.

The present invention is directed to improving devices for a magnetically mounted tool pouch in a manner which is safe, secure, economical and aesthetically pleasing.

For example, U.S. Pat. No. 4,967,435 to Seals discloses a multipurpose bicycle tool kit wherein a set of tools useful for field repair of bicycles is disposed within a pouch suitable for carriage in one's pocket. The Seals invention does not hold general automotive tools in a series of pouches and is not magnetically mountable to the side of an automobile. The present invention comprises a series of pouches designed to hold several classes of automotive repair tool and is magnetically affixed to an automobile side panel generally for home or shop repairs.

In U.S. Pat. No. 5,033,142 to Templeton a diving tool kit is disclosed. The Templeton invention comprises an elongate, hollow handled tool having various attachments organized in a series of pouches commonly held to a body portion of an undersea diver by hook and loop or straplike members. There is no provision in the Templeton invention for holding automotive tools upon the side of an automobile undergoing repairs. The present invention comprises a series of automotive tool holding pouches detachably affixed to a side of an automobile thereby providing protection of the automobile finish and providing easy access of tools for repairs.

In U.S. Pat. Des. 333,040 to Dancyger the ornamental design for a tool pouch is described. The Dancyger invention comprises a series of nested pockets for holding tools and furthermore attaches to a belt worn by a user. There is no provision for magnetically affixing the Dancyger invention to an automobile and the quantity of tools capable of being held therein is limited. The present invention magnetically affixes to an automobile and provides a series of tool pouches for use by automotive mechanics.

In U.S. Pat. Des. 250,926 to Perkins the ornamental design of a tool pouch is disclosed for holding a series of tools upon a panel having two eyelets disposed thereon. A disadvantage in this prior art lies in a lack of magnetic attachment provisions and is of inadequate size to provide protection for a portion of an automobile exterior surface. The present invention comprises an enlarged flexible panel having a series of magnets disposed therein to affix the panel to a side of an automobile and additionally having a series of tool pouches disposed thereon.

U.S. Pat. Number Des. 333,215 to Brown discloses the ornamental design of a tool pouch with holster for a cordless drill. The disclosure teaches a tool pouch worn by an individual. The disclosure makes no provision for magnetically affixing the tool pouch to a side of an automobile. Furthermore, there are no provisions for protecting a large area of an automobile finish from grease and damage. The present invention comprises a plurality of tool pouches attached to a panel which is magnetically affixed to a side of an automobile thereby providing rapid tool access and protection of the automobile finish.

In this respect, the magnetically mounted tool pouch according to the present invention substantially departs from the conventional concepts and designs of the prior art, and in so doing provides an apparatus primarily developed for the purpose of holding tools for easy access upon a side of an automobile and providing a protective barrier thereupon.

Therefore, it can be appreciated that there exists a continuing need for new and improved tool pouches which can be used by an individual to protect a side of an automobile undergoing repairs and hold a plurality of automotive repair tools in close proximity to the user. In this regard, the present invention substantially fulfills this need.

As illustrated by the background art, efforts are continuously being made in an attempt to improve tool pouches. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of tool pouches now present in the prior art, the present invention provides an improved magnetically mounted tool pouch construction wherein the same can be utilized for holding tools at a side of an automobile and protecting the exterior finish thereof. As such, the general purpose of the present invention, which will be described subsequently in greater detail, is to provide a new and improved magnetically mounted tool pouch apparatus and method which has all the advantages of the prior art tool pouches and none of the disadvantages.

The invention is defined by the appended claims with the specific embodiment shown in the attached drawings. For the purpose of summarizing the invention, the invention may be incorporated into a soft fabriclike protective panel having a series of permanent magnets disposed thereon for the purpose of detachably affixing the protective panel to an automobile side portion and furthermore a series of tool holding pouches are permanently affixed to the protective panel thereby providing rapid tool access.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved magnetically mounted tool pouch being magnetically affixed to a side of an automobile.

It is therefore an additional object of the present invention to provide a new and improved magnetically mounted tool pouch which has all the advantages of the prior art tool pouches and none of the disadvantages.

It is another object of the present invention to provide a new and improved magnetically mounted tool pouch which may be easily and efficiently manufactured and marketed.

It is a further object of the present invention to provide a new and improved magnetically mounted tool pouch which is of a durable and reliable construction.

An even further object of the present invention is to provide a new and improved magnetically mounted tool pouch which is susceptible of a low cost of manufacture with regard to both materials and labor, and which accordingly is then susceptible of low prices of sale to the consuming public, thereby making such magnetically mounted tool pouches economically available to the buying public.

Still yet another object of the present invention is to provide a new and improved magnetically mounted tool pouch which provides in the apparatuses and methods of the prior art some of the advantages thereof, while simultaneously overcoming some of the disadvantages normally associated therewith.

Still another object of the present invention is to provide a new and improved magnetically mounted tool pouch having a series of pouches disposed thereon for the purpose of holding automotive tools in a substantially vertical disposition.

Yet another object of the present invention is to provide a new and improved magnetically mounted tool pouch having a plurality of permanent magnets employed to detachably affix the magnetically mounted tool pouch to an exterior portion of an automobile.

Even still another object of the present invention is to provide a new and improved magnetically mounted tool pouch having an enlarged soft, flexible protective panel member which provides protection to an underlying automobile exterior portion from the effects of greasy hands and accidental tool strikes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
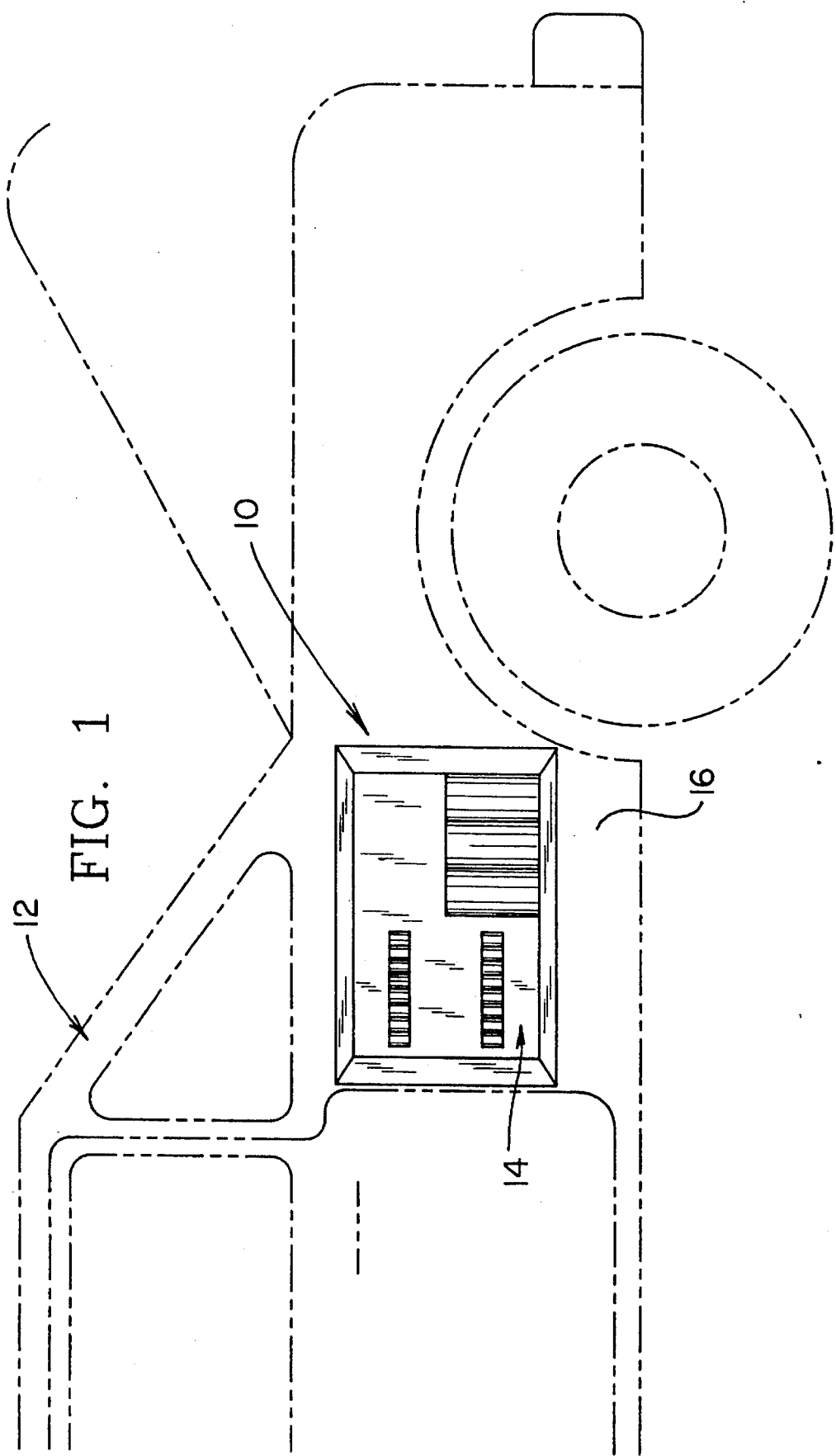
FIG. 1 is a side elevational view of the magnetically mounted tool pouch showing a vehicle mounting disposition.

With reference now to the drawings, and in particular to FIG. 1 thereof, a new and improved magnetically mounted tool pouch embodying the principles and concepts of the present invention and generally designated by the reference numeral 10 will be described.

From an overview standpoint, the magnetically mounted tool pouch 10 is adapted for use with automotive tools and is magnetically affixable to the outside of an automobile 12 for the purpose of holding tools for access by a mechanic working beneath the automobile 12 and furthermore for providing a protective barrier to the finish of automobile 12. See FIG. 1. Construction of the magnetically mounted tool pouch 10 is of soft, flexible materials readily conforming to the frequently contoured surface 16 of a side of automobile 12.

Figure 2:
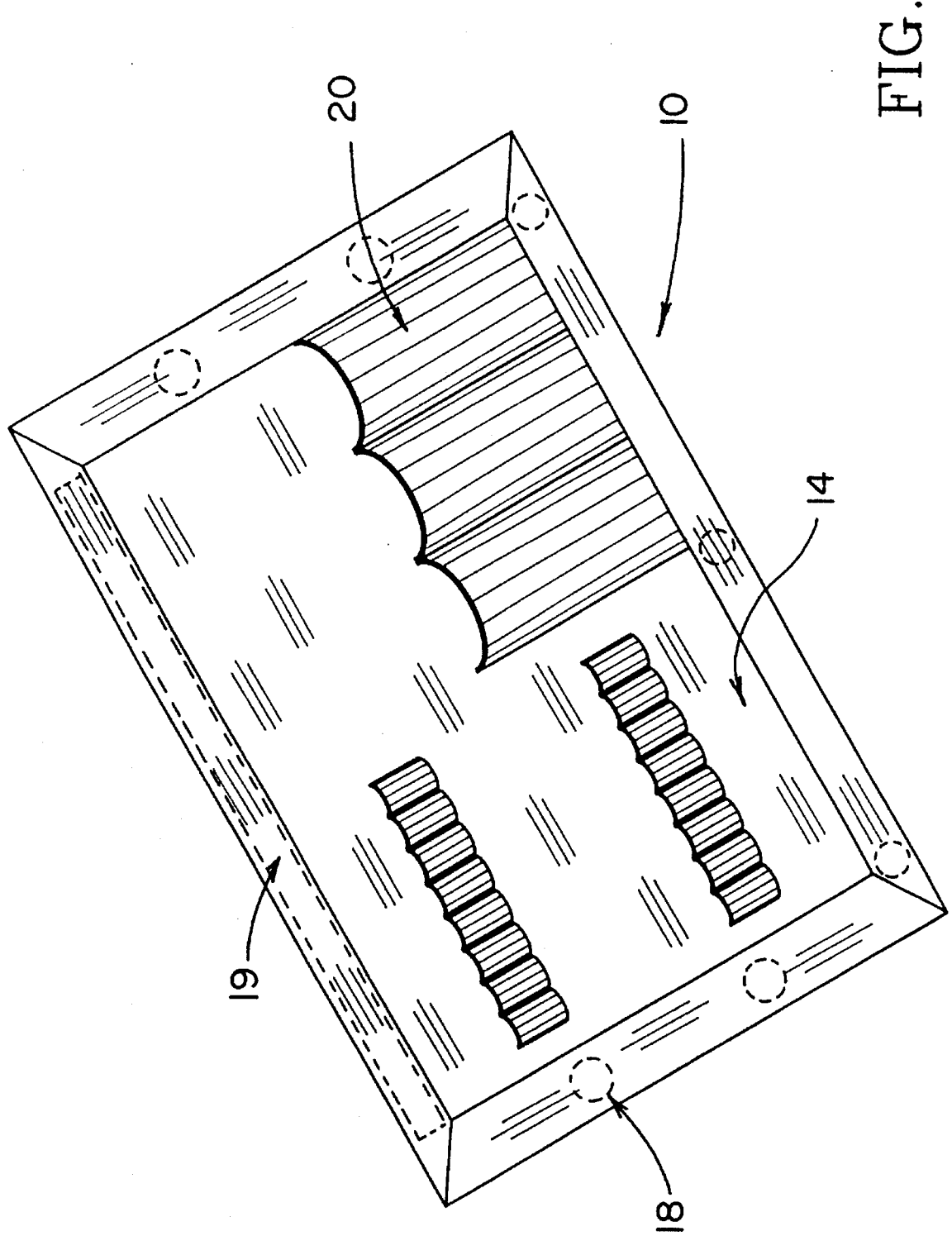
FIG. 2 is a perspective view of the magnetically mounted tool pouch.
Figure 3:
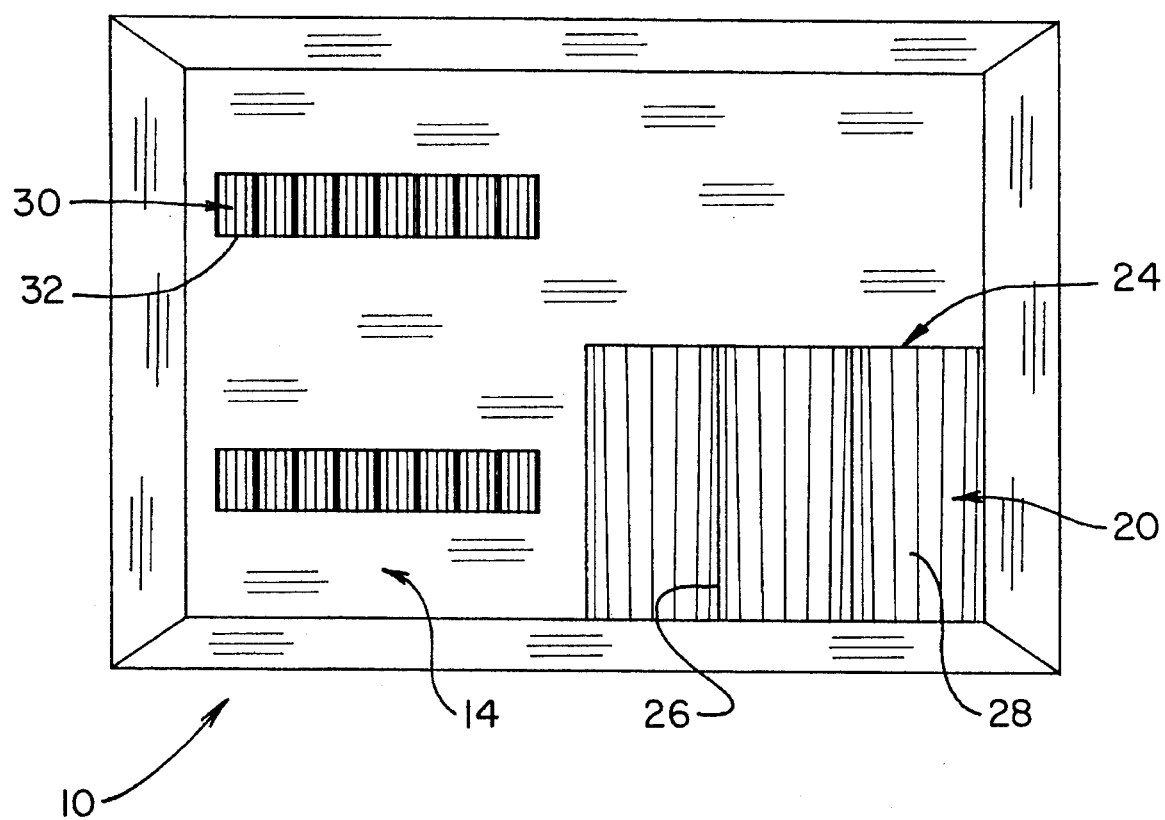
FIG. 3 is a side elevational view of the magnetically mounted tool pouch showing a distribution of tool pouches thereon.
Figure 4:
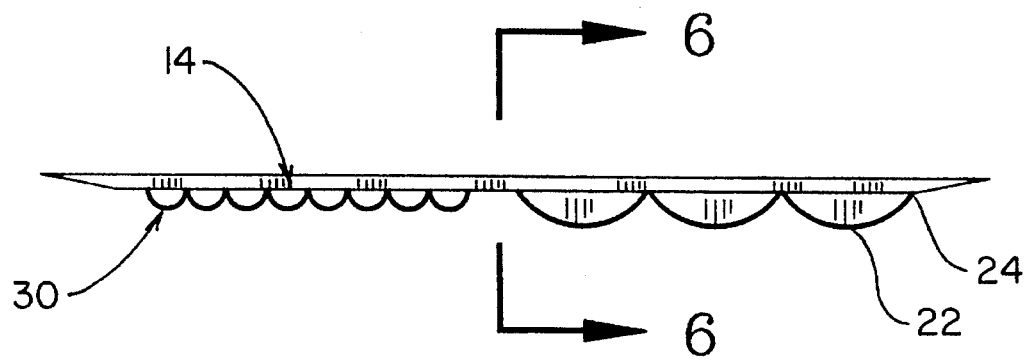
FIG. 4 is a top elevational view of the magnetically mounted tool pouch.

More specifically, it will be noted that the magnetically mounted tool pouch 10 comprises an enlarged flexible panel 14 which is detachable by the use of a series of magnets 18 or a magnetic strip 19 or any combination of magnetic attachment means embedded therein, and furthermore a plurality of tool pouches 20 is disposed thereon in an array being substantially useful to a general group of automobile repair specialists having talents ranging from novice to expert experience levels. See FIG. 2. Tool pouch 20 comprises a flexible fabriclike outer member 22, an open end portion 24, a plurality of side portions 26, and a bottom portion 28. See FIGS. 3 and 4. Side portions 26 and bottom portion 28 are generally permanently affixed to panel 14. A second form of pouch 30 has a bottom portion 32 being open at least in part thereby permitting long handled tools to be held therein. Pouches 20 and 30 may be arranged singularly or in groups upon panel 14.

Figure 5:
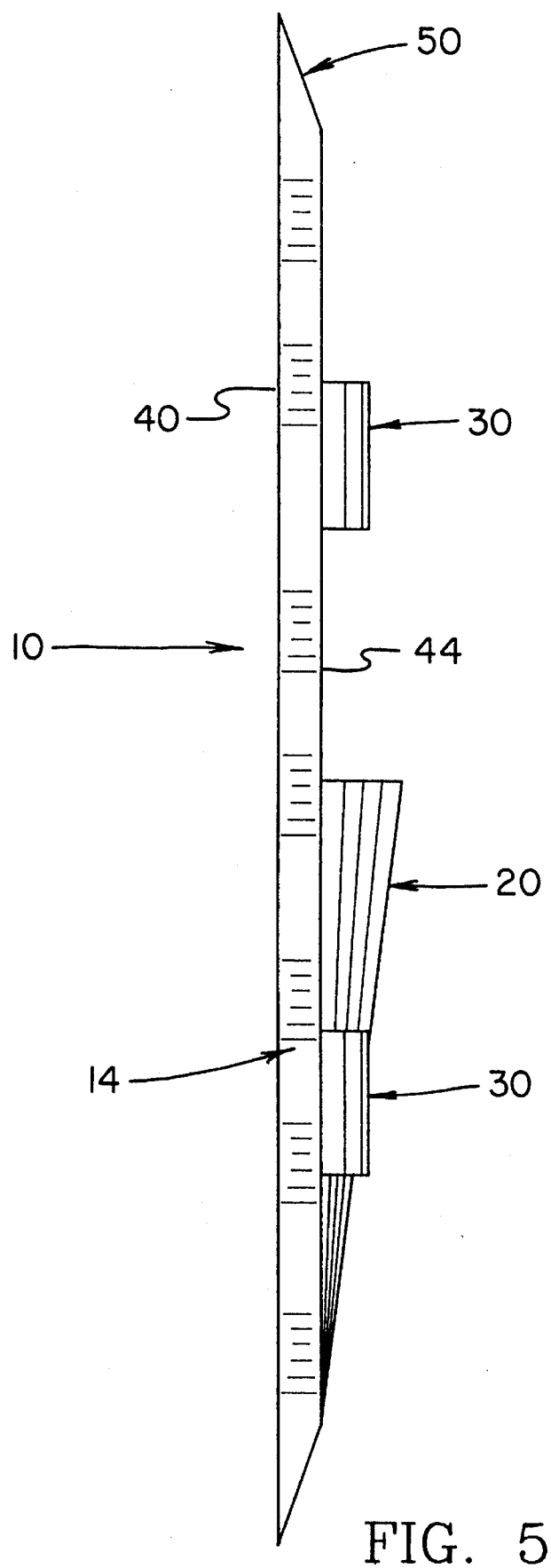
FIG. 5 is a side elevational view of a magnetically mounted tool pouch.
Figure 6:
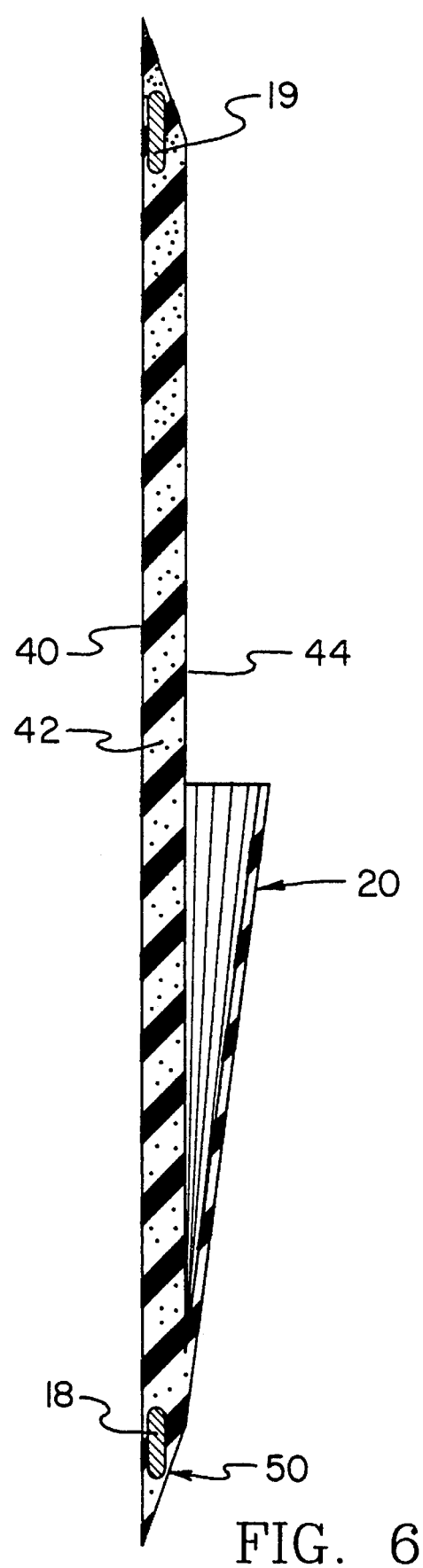
FIG. 6 is a side sectional view of the magnetically mounted tool pouch taken substantially upon the plane indicated by the section line 6—6 of FIG. 4.

Enlarged flexible panel 14 comprises a rectangular sheet having a first surface portion 40, a central portion 42, and a second surface portion 44. See FIGS. 5 and 6. First surface portion 40 comprises a soft fabriclike material which is readily cleaned and has little affinity for collecting dusts and grime, and furthermore has established non-marring qualities when repeatedly disposed upon a finished exterior surface of a wide range of types of automobile 12. Regions of first surface portion 40 intimately contact an exterior surface of automobile 12 particularly those regions adjacent magnets 18 and magnetic strip 19. Central portion 42 comprises a soft foamlike material providing a cushioning effect to preclude scratch and dent damage to the exterior finish of automobile 12 when removing or replacing tools from the magnetically mounted tool pouch 10 affixed thereon. Magnets 18 and magnetic strip 19 are embedded within central portion 42 and are generally disposed in close proximity to first surface portion 40 to maximize the magnetic adhering force associated therewith. Edges 50 of central portion 42 are chamfered to meet first surface portion 40 and second surface portion 44 wherein second surface portion 44 is of generally smaller dimension than first surface portion 40 thereby providing a substantially uniform border therewith.

Edges 50 may have applied thereon a material similar to or an extension thereof second surface portion 44 thereby providing a potentially desirable cosmetic effect. Second surface portion 44 comprises a durable material substantially impervious to grease, oil, and common solvents thereby providing a protective barrier for the automobile 12 exterior finish from hand born and tool borne grease and other detrimental agents. Pouches 20 and 30 are generally affixed to the second surface portion 44, however, attachment using sewn seams may be obtained by penetrating first surface portion 40 and central portion 42 as well as second surface portion 44 with sewing thread. A suitable size for enlarged flexible panel member 14 is a rectangle thirty two inches in minor dimension by forty eight inches in major dimension.

Magnets 18 may be discrete ceramic or ferritic elements in a discoidal or substantially rectangular shape, or magnets in polymeric sheet form may be cut into smaller portions thereby providing a series of discrete magnets 18. Magnetic strip 19 comprises a flexible polymeric based magnetic structure designed to perform such functions as aiding in detachably sealing refrigerator doors wherein repeated engagement and disengagement is commonplace.

In an alternate embodiment, the magnetically mounted tool pouch is of irregular shape. In yet another alternate embodiment the magnetically mounted tool pouch has magnetically affixing strap members thereon to provide additional support of tools held therein. And in yet another alternate embodiment the tool pouches are absent from the magnetically mounted tool pouch and the sole purpose of application is to protect the exterior surface of automobile 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved magnetically mounted tool pouch for detachably affixing tools to the side of an automobile and furthermore for providing a surface finish protective barrier thereupon comprising:

a flexible panel member comprising a first surface portion of soft, flexible construction, a centrally disposed portion of soft energy absorbing foam composition, and a second surface portion of composition substantially impervious to grease, oil, and solvent penetration;

at least one pouch affixed to the first surface portion of said flexible panel member, the pouches comprising a series of pouches of a first kind having a closed bottom, two closed sides and an open top, and pouches of a second kind having an open top, two closed sides, and a bottom open at least in part thereof, and a magnetic fastening means for detachable affixing the flexible panel member to an exterior surface of an automobile, the magnetic fastening means comprising at least one permanent flexible magnet embedded within the soft energy absorbing foam of said centrally disposed portion of said flexible panel member.

* * * * *